United States Patent
Sipilä

(10) Patent No.: US 6,356,766 B1
(45) Date of Patent: *Mar. 12, 2002

(54) COMPRESSED DATA SERVICE IN DECT/GSM INTERWORKING

(75) Inventor: Tuomo Sipilä, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/620,887

(22) Filed: Jul. 21, 2000

Related U.S. Application Data

(62) Division of application No. 08/949,199, filed on Oct. 10, 1997, now Pat. No. 6,128,505.

(30) Foreign Application Priority Data

Oct. 11, 1996 (GB) .............................................. 9621243

(51) Int. Cl.[7] ................................................ H04Q 7/20
(52) U.S. Cl. ..................... 455/465; 455/72; 455/422; 455/426; 455/552
(58) Field of Search .......................... 455/465, 72, 422, 455/426, 552, 561, 466, 553, 462, 517, 414, 68, 69, 70, 71; 370/477, 280, 465; 375/240

(56) References Cited

U.S. PATENT DOCUMENTS

| | | | | | |
|---|---|---|---|---|---|
| 5,131,016 A | * | 7/1992 | Broughton et al. | ............ | 455/72 |
| 5,499,240 A | * | 3/1996 | Gittins et al. | ................ | 370/477 |
| 5,521,940 A | * | 5/1996 | Lane et al. | | |
| 5,546,395 A | * | 8/1996 | Sharma et al. | ............... | 370/477 |
| 5,590,133 A | * | 12/1996 | Billstron et al. | ............ | 370/349 |
| 5,701,302 A | * | 12/1997 | Geiger | .......................... | 455/72 |
| 5,758,256 A | * | 5/1998 | Berry et al. | ................... | 455/72 |
| 5,781,848 A | * | 7/1998 | Komoda | ....................... | 455/72 |
| 6,128,505 A | * | 10/2000 | Sipila | ......................... | 455/465 |

FOREIGN PATENT DOCUMENTS

| | | | | |
|---|---|---|---|---|
| EP | 0748136 A1 | * | 5/1996 | ............ H04Q/7/22 |
| GB | 8339 A | * | 2/1996 | ............ H04Q/7/22 |
| WO | WO 94/05104 | * | 8/1993 | ............ H04L/25/49 |
| WO | WO 96/19065 | * | 12/1995 | ............ H04L/29/08 |
| WO | WO 97/48212 | * | 6/1997 | ............ H04L/12/56 |

OTHER PUBLICATIONS

ETR 341 Radio Equipment and System Dec. 1996.*
ETS 300 792 Digital Enhanced Cordless telecommunications (DECT) Jun. 1997.*
XP 000613490 DECT System as an extention to GSM infrastructure.*

* cited by examiner

Primary Examiner—Daniel Hunter
Assistant Examiner—Yemane Woldetatios
(74) Attorney, Agent, or Firm—Perman & Green, LLP

(57) ABSTRACT

A DECT fixed part for providing a communications link between a DECT portable part and a GSM mobile switch center, the fixed part comprising a compression negotiation means for: receiving from one of the portable part and the mobile switch center a first message specifying a form of compression for a data service; and using that first message, determining a second message to be sent to the other of the portable part and the mobile switch center to request it to adopt a corresponding form of compression for the data service; so as to allow the provision of a compressed data service between the portable part and the mobile switch center.

1 Claim, 3 Drawing Sheets

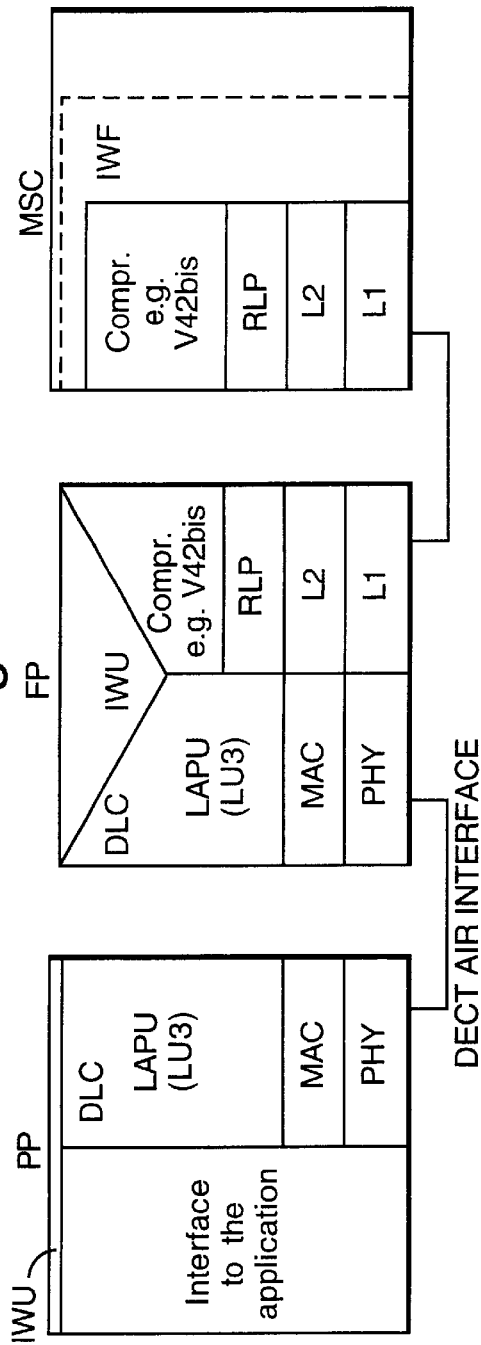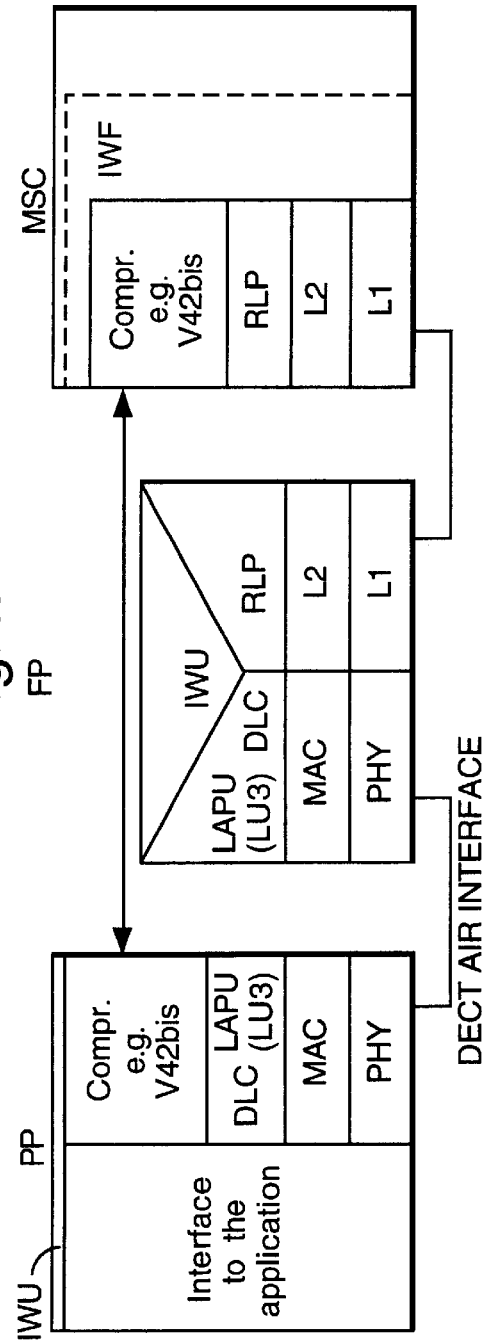

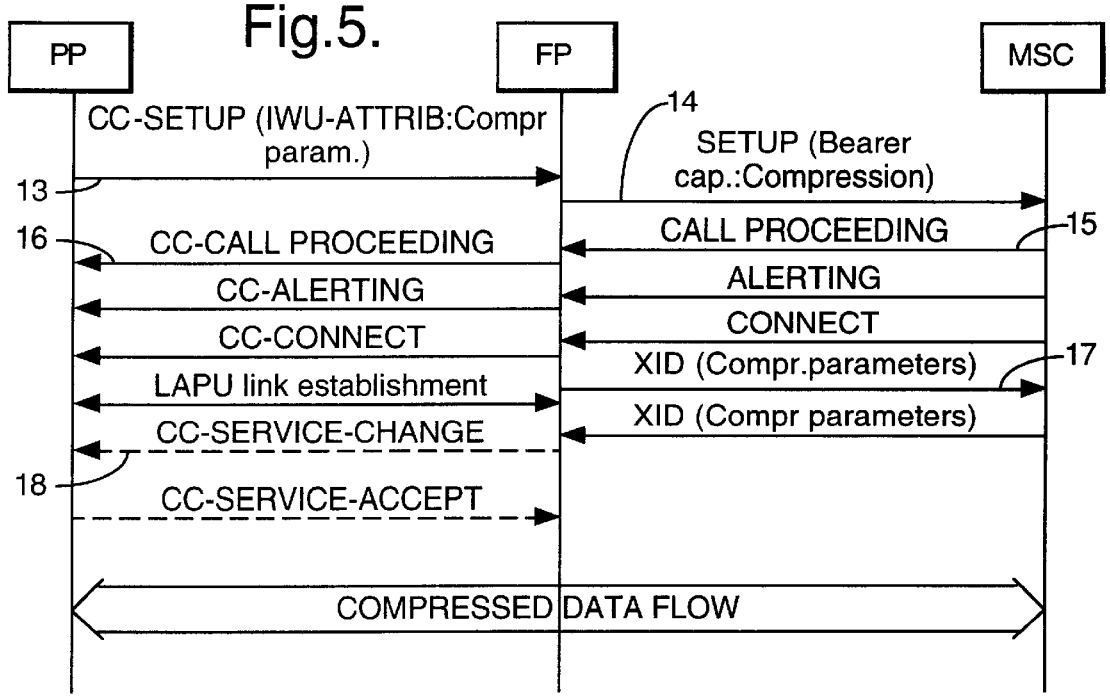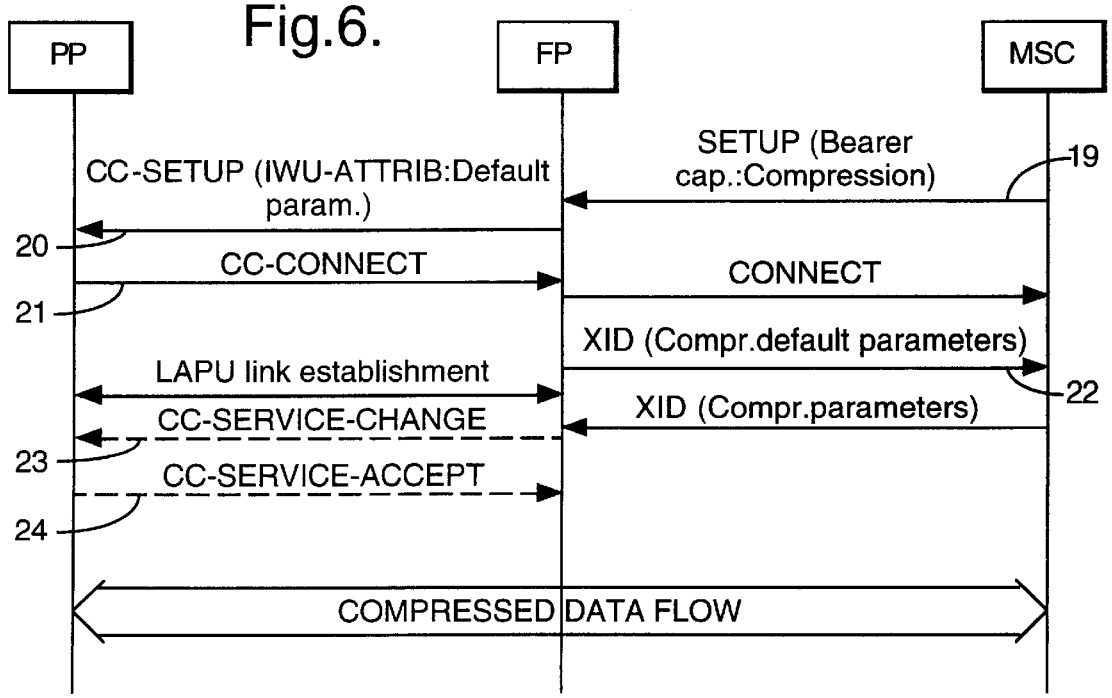

COMPRESSED DATA SERVICE IN DECT/GSM INTERWORKING

This application is a divisional application of application Ser. No. 08/949,199 filed Oct. 10, 1997 now U.S. Pat. No. 6,128,505.

FIELD OF THE INVENTION

This invention relates to providing a compressed data service in DECT/GSM Interworking.

BACKGROUND OF THE INVENTION

FIG. 1 shows a functional reference configuration for conventional interworking between a DECT (digital European cordless telephone) system and a GSM (global system for mobiles) system. FIG. 1 shows that the DECT portable part (PP) 1 communicates with the DECT fixed part (FP) 2 over an air interface 3. The fixed part 3 communicates with a GSM mobile switch centre (MSC) 4 over the standard GSM A-Interface 5. The fixed part comprises at least one radio fixed part (RFP) 6, which communicates wirelessly with the portable part, and a cluster control fixed part (CCFP) 7 which handles communications between the fixed part and the mobile switch centre.

In the signalling plane of the A-interface mapping takes place only on the CC/NWK and MM/NWK levels, so the DECT system does not use the lower layers of the A-interface. Documents [12] to [18] listed below provide detailed definitions of how GSM services are provided over the DECT air interface.

Document [14] cited below defines the implementation of bearer services. This takes as its basis that in the DECT/GSM interface the GSM error correcting protocol RLP is terminated to the interworking unit (IWU) of the DECT fixed part, and the DECT air interface (based on the C data profile) provides its own error correction over the DECT air interface by re-transmitting the MAC (medium access control) layer protocol and by the DLC (data link control) layer re-transmitting the LAPU protocol.

This protocol model is illustrated in FIG. 2, where block 8 represents the DECT portable part, block 9 represents the DECT fixed part and block 10 represents the GSM mobile switch centre interworking unit. Thus, in this standard implementation the RLP and LAPU protocols function independently; the RLP protocol operating over the A-interface (11 in FIG. 2) between GSM and DECT and the LAPU protocol operating over the DECT air interface (12 in FIG. 2). The LAPU protocol runs all the way from the CCFP to the PP, so during provision of a data service—in which the system carries signals representing data that has been provided to the system in a digital form by a user of the DECT portable part, or that is to be provided by the system to that user in a digital form—situations where data might be lost in DECT internal handover can be taken care of either by the DECT MAC layer error correction or by the LAPU. However, error correction in the event of external handover is unclear.

Currently only the DECT C-data profile defines the use of V.42bis compression over the U-plane link by using C-plane Call Control (CC) negotiation for the compression parameter negotiation. No such functionality is defined for the DECT A/B profiles. (See documents [20] and [22]).

A significant weakness of the system described above is the relatively low data transmission level it provides over the radio interface: the highest available data rate is 9600 bps (bits per second). However, DECT provides a higher capacity over its air interface and could support higher transmission speeds.

The present invention aims to address this problem.

According to the present invention from a first aspect there is provided a DECT fixed part for providing a communications link between a DECT portable part and a GSM mobile switch centre, the fixed part comprising a compression negotiation means for: receiving from one of the portable part and the mobile switch centre a first message specifying a form of compression for a data service; and using that first message, determining a second message to be sent to the other of the portable part and the mobile switch centre to request it to adopt a corresponding form of compression for the data service; so as to allow the provision of a compressed data service between the portable part and the mobile switch centre.

The compression negotiation means preferably acts so as to, in effect, translate messages specifying forms of data service compression between the protocols of the links between the fixed part and the portable part and the first part and the mobile switch centre. The first message may suitably be a CC-SETUP message received from the portable part, in which case the second message may suitably be a SETUP message that is sent to the mobile switch centre. The first message may be a SETUP message received from the mobile switch centre, in which case the second message may suitably be a CC-SETUP message that is sent to the portable part.

One or more XID messages between the fixed part and the mobile switch centre may be used to establish an acceptable form of compression.

SUMMARY OF THE INVENTION

According to the present invention from a second aspect there is provided a method for providing a compressed data service across a communications link between a DECT portable part and a GSM mobile switch centre via a DECT fixed part, comprising: one of the portable part and the mobile switch centre sending to the fixed part a first message specifying a form of compression for a data service; the fixed part using that first message to determine a second message to be sent to the other of the portable part and the mobile switch centre to request it to adopt a corresponding form of compression for the data service; and the fixed part sending that message to the said other of the portable part and the mobile switch centre.

Preferably, if the said other of the portable part and the mobile switch centre determines that the said form of compression is not acceptable to it then it sends to the fixed part another first message specifying another form of compression for the data service. This step can be repeated. In this way, the fixed part suitably facilitates the establishment of a compressed data service that extends from end to end, between the portable part and the mobile switch centre. Once a form of data service compression has been established then one of the portable part and the mobile switch centre preferably begins to compress user data according to that compression scheme and transmits it towards the other of the portable part and the mobile switch centre. The user data is preferably not compressed or decompressed by the fixed part. On receipt the data is preferably decompressed by the said other of the portable part and the mobile switch centre.

Preferably, if the fixed part determines that a form of compression for the compressed data service that is acceptable to both the portable part and the mobile switch centre cannot be established then it sends a message to the mobile switch centre to request a form of data service compression between the fixed part and the mobile switch centre. In this case, the fixed part suitably includes compression/decompression means for compressing/decompressing data sent/received over the data service to/from the mobile switch centre.

Preferably, if the fixed part determines that a form of compression between the fixed part and the mobile switch centre cannot be established then it sends a message to the mobile switch centre to request no data service compression between the fixed part and the mobile switch centre.

The mobile switch centre suitably has an interworking unit that includes compression/decompression means. The fixed part preferably includes an interworking unit that preferably provides the compression negotiation means described above and/or preferably performs the steps described above for the fixed part. The portable part preferably includes compression/decompression means.

The negotiation procedures described above are preferably performed by means of the DECT A/B-profile.

The compression may be V.42bis compression, preferable with one or more of the said messages specifying parameters that may include one or more of: type of data compression, number of possible codewords in the algorithm and maximum encodable data string length.

DESCRIPTION OF THE FIGURES

FIG. 3 shows a protocol stack for the situation where compression is used only between the GSM MSC IWF and the DECT FP IWF;

FIG. 4 shows a protocol stack for the situation where compression is used end-to-end between the MSC IWF and the DECT PP;

FIG. 5 shows the signalling used to make a compressed data service connection between a DECT portable part and a GSM MSC for the case of a mobile originated call; and FIG. 6 shows the signalling used to make a compressed data service connection between a DECT portable part and a GSM MSC for the case of a mobile terminated call.

DETAILED DESCRIPTION OF EMBODIMENTS OF THE INVENTION

Figure 1:
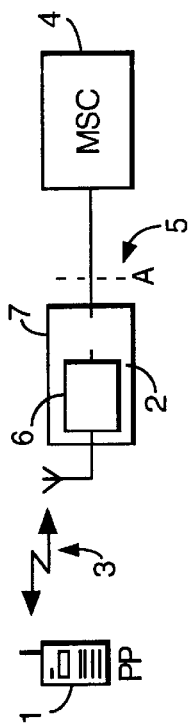
FIG. 1 shows the functional reference configuration for DECT/GSM interworking.
Figure 2:
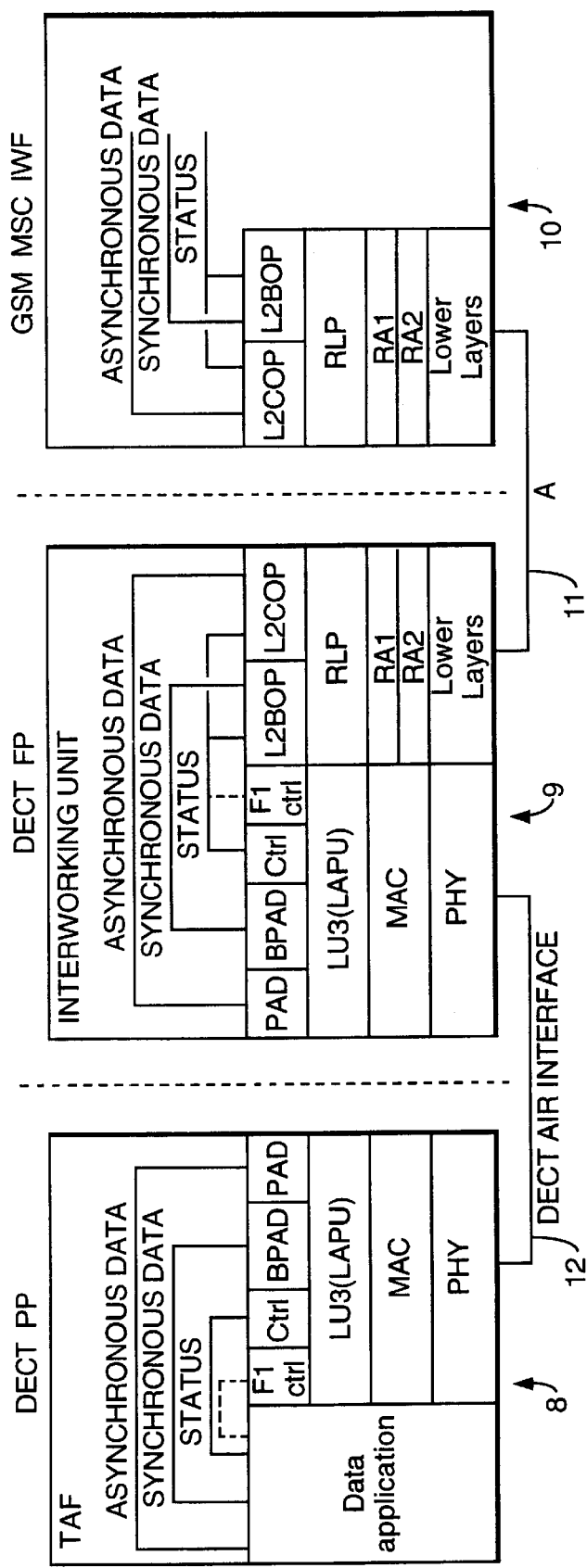
FIG. 2 shows the protocol stack for standard DECT/GSM non-transparent bearer services interworking.

The present invention will now be described by way of example with reference to the accompanying drawings.

In the proposed GSM phase 2+ data services enhancement a new bearer service is planned, in which data is compressed between the MSC and the MS, i.e. in the GSM transmission path. In DECT, compression has been defined only for the C-data profile (see document [19]). If compression usage could be added to the A/B data profile (see documents [20] and [22] the compression of local area network traffic conveyed over the DECT air interface may be possible.

The embodiments set out below shows how the GSM Phase 2+ compressed data service can be used in DECT/GSM interworking. Two alternatives are described:

1. The compression is used solely in the A-interface, between the GSM mobile switch centre interworking function and the DECT fixed part interworking function, whilst the DECT interface (between the fixed part and the portable part) uses a standard data transmission scheme.

2. The compression is used as an end-to-end function all the way between the GSM mobile switch centre interworking function and the DECT portable part. This alternative is more complex because it requires service parameter negotiation. The embodiments may allow user rates to be increased with only minor changes to the established DECT/GSM interworking procedure, and better utilisation of the DECT air interface in DECT/GSM interworking (by virtue of the end-to-end compression) without large changes to the A interface. The signalling defined for the C-data profile compression service negotiation could be used also for the A/B-profile.

Alternative 1: Compression is Used only Between GSM MSC IWF and FP IWF

In this solution the compression used in the GSM air interface (e.g. V.42bis) is run up to the interworking function of the DECT fixed part (DECT FP IWF) where the data is decompressed and forwarded to the standard DECT data profile protocol, such as LAPU. This implementation does not require any specific interworking function between DECT and GSM signalling since the only change needed is to build a decompression/compression mechanism for the data in the FP IWF (for instance by updating the RLP engine in the FP has to be updated). The PP does not even have to be aware that compression is used over the A-interface. However, the PP could, with signalling, indicate the compression requirement for the A-interface, thus preparing itself for higher user rates.

A protocol stack for this alternative is illustrated in FIG. 3.

This alternative has the advantages that:

1. It can be added on to the current standards without additional signalling mapping.
2. Since the DECT air interface is capable of larger transmission speeds the DECT capacity can be better utilised by increasing the A interface data transmission capacity with compression.
3. No large changes are needed in the GSM A-interface for the higher bit-rates However, the compression functionality may complicate to some extent the FP IWU function (this should not be a major problem) and it must be borne in mind that the bit-rate may vary depending on the users data contents Alternative 2: Compression is used End-to-end Between MSC IWF and DECT PP In this alternative the compression is run end to end between the interworking function (IWF) of the MSC and the DECT PP. Thus the FP IWF only conveys the information without interrupting or decompressing/compressing the data. This requires the negotiation of compression parameters between the end points. Thus the FP IWU has to do some additional mapping between DECT signalling and GSM RLP compression parameter negotiation.

A protocol stack for this alternative is illustrated in FIG. 4.

The compression parameters are negotiated during call establishment for both links (LAPU and RLP). This implies that the parameters in the XID message must be conveyed to the DECT part in DECT call control messages. If the same parameters can not be agreed then the FP IWU must decompress/compress the data separately for both links (LAPU and RLP) or use compression only over the A interface. In this situation compression is used in both directions.

FIG. 5 shows the signalling used to make a compressed data service connection between a DECT portable part and a GSM MSC for the case of a mobile originated call. When the call is mobile originated the PP negotiates the compression (e.g. V.42bis) parameters by using the Call Control negotiation procedure as defined in the C-data profile (see document [19]) and then uses the same parameters in the RLP link XID negotiation.

Referring to FIG. 5, the PP begins the establishment of a connection by submitting to the FP a {CC-SETUP} message (at 13) carrying the <<IWU-ATTRIBUTES>> information element with compression requires filed set to on and carrying the compression parameters. Upon receipt of the call request the FP submits a SETUP message (at 14) towards the MSC (as defined in ETS 300 370 document [14]) and stores the compression parameters for further use. The SETUP message carries an indication of the compression request in its bearer capability element. If the MSC accepts the request it replies with CALL PROCEEDING (at 15) with missing or unchanged bearer capability element. This message is in turn mapped by the FP IWU to the DECT {CC-CALL PROCEEDING} message (at 16) indicating either accepted or non-accepted compression.

After the appropriate alerting an connecting messages the FP IWU RLP begins initialisation of the RLP link by issuing XID (at 17) carrying the compression parameters received from the DECT PP. If the MSC IWF accepts the parameters then compressed data traffic can be started. If the parameters carried back in the XID sent by the MSC IWF are not in line with the request from the PP the FP IWU may initiate a service negotiation again by issuing the changed parameters with {CC-SERVICE-CHANGE} message (at 18) containing <<IWU-ATTRIBUTES>> specifying data traffic with new parameters. This procedure can be used even in the middle of an established connection.

FIG. 6 shows the signalling used to make a compressed data service connection between a DECT portable part and a GSM MSC for the case of a mobile terminated call. When the call is mobile terminated the FP does not know the compression parameters when the Call Control negotiation takes place. When the RLP link has been established the DECT can negotiate the XID parameters using the call modification procedures.

Referring to FIG. 6, the MSC indicates a demand for compressed connection with a set field in the BEARER CAPABILITY element of the SETUP message (at 19). Upon receipt of this indication the FP IWU requests the compressed service with default values from the PP (at 20). If the PP accepts it by issuing {CC-CONNECT} (at 21) the FP IWU issues a non modified CONNECT message to the MSC.

After this the FP IWU initiates the RLP link by issuing XID with default compression parameters (at 22) or if the MSC initiates the RLP link the FP IWU RLP replies with XID carrying the default compression parameters. After this procedure compressed data traffic can commence.

If for some reason the MSC IWF cannot provide a compression as requested by the PP the FP IWU may initiate the in-call modification process by issuing the new parameter values to the PP. This is done by sending the new values in a {CC-SERVICES-CHANGE} message (at 23) containing <<IWU-ATTRIBUTES>> carrying the new parameters, if the PP replies with {CC-SERVICES-ACCEPT} (at 24) then compressed data traffic with new parameters can be started. This procedure can be used even in the middle of an established connection.

If the negotiation is successful then compression can be run end-to-end with the same parameters, yielding significant improvements. This approach is also flexible because if compression cannot be agreed for end-to-end connection then the link can fall back either to approach 1 above or to abandoning compression all together.

When compression is used over the DECT air interface then some spectrum is saved. However, this requires there to be a compression engine present in the DECT portable part.

One option is to add the required compression negotiation mechanism as currently defined in the C profile (see document [21]) to the A/B.2 profile Call Control functionality (see document [22]). V.42bis compression can then be used for the LU2 based frame transmission. A/B profile signalling must convey in the IWU-ATTRIBUTES element the required compression parameters, for V.42bis these are:

type of data compression

V.42bis data compression request number of possible codewords in the algorithm; and maximum encodable data string length.

In addition the A/B profile must support the peer attribute service negotiation defined in ETS 300 175-5 (document [5]).

By allowing the use of V.42bis compression the current maximum DECT data rate of 288 kbps for bi-directional and 552 kbps for unidirectional traffic can be increased to a rate in the range from 288 to 1152 kbps for bi-directional and 552 to 2208 kbps for unidirectional, depending on the data being conveyed.

One useful approach is to use alternative 1 as a fallback solution, i.e. if end-to-end compression cannot be used then the GS compression is terminated to the FP IWU. Due to the negotiation process there can be implementations of the above approaches with non-compressing systems (MSC and DECT). Thus either one alone, both or none of the two carrying links can adopt compression.

Either approach is, of course, only beneficial if different protocols are used on the A-interface and the DECT air interface, for example not in conjunction with approach 1 set out in our co-pending patent application with applicant's reference PAT 96417 EP.

A/B profile compression could prove extremely useful in the future when traffic rate demands are increasing yet the wireless DECT link is used only as a transportation means for upper layer frames.

REFERENCES

The following list gives details of the documents referred to above, as well as other relevant documents. Documents ETS 300 175 1 to 8 [1] to [8] and ETRs [9] to [11] give more information about the DECT system. Documents [12] to [18] give more information about DECT/GSM interworking. Documents [19], [20] and [22] give more information about the DECT data profiles.

[1] ETS 300 175-1 2nd edition: "Radio Equipment and Systems (RES); Digital European Cordless Telecommunications (DECT) Common Interface Part 1: Overview".

[2] ETS 300 175-2 2nd edition: "Radio Equipment and Systems (RES); Digital European Cordless Telecommunications (DECT) Common interface Part 2: Physical layer".

[3] ETS 300 175-3 2nd edition: "Radio Equipment and Systems (RES); Digital European Cordless Telecommunications (DECT) Common Interface Part 3: Medium access control layer".

[4] ETS 300 175-4 2nd edition: "Radio Equipment and Systems (RES); Digital European Cordless Telecommunications (DECT) Common Interface Part 4: Data link control layer".

[5] ETS 300 175-5 2nd edition: "Radio Equipment and Systems (RES); Digital European Cordless Telecommunications (DECT) Common Interface Part 5: Network layer".

[6] ETS 300 175-6 2nd edition. "Radio Equipment and Systems (RES); Digital European Cordless Telecommunications (DECT) Common Interface Part 6: Identities and addressing".

[7] ETS 300 175-7 2nd edition: "Radio Equipment and Systems (RES); Digital European Cordless Telecommunications (DECT) Common Interface Part 7: Security features".

[8] ETS 300 175-8 2nd edition: "Radio Equipment and Systems (RES); Digital European Cordless Telecommunications (DECT) Common Interface Part 8: Speech coding and transmission".

[9] ETR 015: "Digital European Cordless Telecommunications Reference document".

[10] ETR 043: "Radio Equipment and Systems (RES); Digital European Cordless Telecommunications (DECT) Common Interface Services and Facilities requirements specification".

[11] ETR 056: "Digital European Cordless Telecommunications System description document".

[12] ETS 300 370 2nd edition: Radio Equipment and Systems (RES); Digital European Cordless Telecommunications/Global System for Mobile Communications (DECT/GSM) Interworking profile, Access and mapping (Protocol/procedure description for 3.1 KHz speech service).

[13] prETS 300 499; "Radio Equipment and Systems (RES); Digital European Cordless Telecommunication/Global System for Mobile Communications (DECT/GSM) Interworking profile GSM MSC—DECT FP Fixed Interconnection".

[14] DE/RES-03071 (September 1995): "Radio Equipment and Systems: Digital European Cordless Telecommunications (DECT),/Global System for Mobile communications (DECT/GSM) inter-working profile, Implementation of bearer services".

[15] (DE/RES-03049) prETS 300 499 (August 1995): "Radio Equipment and Systems (RES); Digital European Cordless Telecommunications/Global System for Mobile Communications (DECT/GSM) Interworking profile, GSM-MSC—DECT-FP Fixed Interconnection"

[16] (DE/RES-03050) (June 1995): "Radio Equipment and Systems (RES); Digital European Cordless Telecommunications/Global System for Mobile Communications (DECT/GSM) Inteworking profile, GSM Phase 2 supplementary services Implementation"

[17] (DE/RES-03057): "Radio Equipment and Systems (RES); Digital European Cordless Telecommunications/Global System for Mobile Communications (DECT/GSM) Interworking profile, Implementation of Short message services, point to point and Cell broadcast"

[18] (DE/RES-03058): "Radio Equipment and Systems (RES); Digital European Cordless Telecommunications/Global System for Mobile Communications (DECT/GSM) Interworking profile, Implementation of facsimile group 3"

[19] prETS 300 001; "Radio Equipment and Systems (RES); Digital European Cordless Telecommunications (DECT) Data services profile, Generic data link service, Service Type C, Class 2".

[20] prETS 300 435: "Radio Equipment and Systems (RES); Digital European Cordless Telecommunications (DECT) Data Services Profile Base Standard including interworking to connectionless networks (service types A and B, Class 1)"

[21] GSM 04.22: "Radio Link Protocol (RLP) for data and telematic services on the Mobile Station—Base Station System (MS—BSS) interface and the Base Station System—Mobile-services Switching Centre (BSS—MSC) interface"

[22] prETS 300 701: "Radio Equipment and Systems (RES); Digital European Cordless Telecommunications (DECT) Data Services Profile Generic Frame relay service with mobility (service types A and B, Class 2)"

All these documents are incorporated herein by reference in their entirety.

The present invention includes any novel feature or combination of features disclosed herein either explicitly or implicitly or any generalisation thereof irrespective of whether or not it relates to the claimed invention or mitigates any or all of the problems addressed. In view of the foregoing description it will be evident to a person skilled in the art that various modifications may be made within the scope of the invention.

What I claim is:

1. A system for providing a compressed data service between a DECT portable part and a GSM mobile switch center comprising:

a high speed transmission communications link between the DECT portable part and the GSM mobile switch center;

a compression negotiation device adapted to translate messages specifying a form of a data service compression protocol for the communications link between the portable part and the mobile switch center; and at least one interworking unit including a compression/decompression device for compressing/decompressing data.

* * * * *